United States Patent
Chu et al.

(10) Patent No.: US 10,006,415 B2
(45) Date of Patent: Jun. 26, 2018

(54) AUXILIARY COOLING SYSTEM

(71) Applicant: Hyundai Motor Company, Seoul (KR)

(72) Inventors: Dong Ho Chu, Ansan-si (KR); Jong Il Park, Seoul (KR); Dong Hee Han, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 34 days.

(21) Appl. No.: 14/936,338

(22) Filed: Nov. 9, 2015

(65) Prior Publication Data

US 2017/0030306 A1  Feb. 2, 2017

(30) Foreign Application Priority Data

Jul. 30, 2015  (KR) .................. 10-2015-0107952

(51) Int. Cl.
*F01P 11/04*  (2006.01)
*F02M 26/33*  (2016.01)
*F01P 7/14*  (2006.01)
*F02B 29/04*  (2006.01)

(52) U.S. Cl.
CPC ............ *F02M 26/33* (2016.02); *F01P 7/14* (2013.01); *F01P 11/04* (2013.01); *F02B 29/0406* (2013.01); *F01P 2037/02* (2013.01); *Y02T 10/146* (2013.01)

(58) Field of Classification Search
CPC ..... F02D 41/0007; F01P 2060/02; F01P 7/10; F01P 7/14; F01P 3/00; F01P 9/00
See application file for complete search history.

(56) References Cited

U.S. PATENT DOCUMENTS

| | | | |
|---|---|---|---|
| 4,348,991 A * | 9/1982 | Stang .................. | F01P 7/14 123/41.29 |
| 7,421,999 B2 * | 9/2008 | Kim .................. | F02D 41/0025 123/25 C |
| 7,669,416 B2 * | 3/2010 | Pantow .................. | F01P 5/12 123/41.01 |
| 9,086,026 B2 * | 7/2015 | Levijoki .................. | F02D 41/04 |

(Continued)

FOREIGN PATENT DOCUMENTS

| | | |
|---|---|---|
| JP | 2004-332699 | 11/2004 |
| JP | 2013-217344 | 10/2013 |

(Continued)

*Primary Examiner* — Long T Tran
(74) *Attorney, Agent, or Firm* — Brinks Gilson & Lione

(57) ABSTRACT

An auxiliary cooling system which is provided separately from an engine cooling passage in a vehicle provided with a turbo engine. The auxiliary cooling system includes a first line which connects a radiator and an intercooler to each other and on which an electric water pump is installed. A second line connects the intercooler and an intake manifold. A third line connects the intake manifold and the radiator, and a bypass valve selectively directly transfers cooling water, heated while passing through a turbine housing provided on a path of the third line, to the radiator or transfers the cooling water to the radiator via an engine block or a heater. Cooling water discharged from the intake manifold passes through an ETC (electronic throttle control) unit and thus reduces a temperature of intake air passing through the ETC unit.

7 Claims, 1 Drawing Sheet

(56) References Cited

U.S. PATENT DOCUMENTS

| | | | | |
|---|---|---|---|---|
| 2006/0225417 | A1* | 10/2006 | Pantow | F01P 5/12 60/599 |
| 2008/0000445 | A1* | 1/2008 | Kim | F02D 41/0025 123/295 |
| 2012/0174579 | A1* | 7/2012 | Brinkmann | F01P 3/20 60/605.3 |
| 2012/0192557 | A1* | 8/2012 | Johnson | F01D 17/105 60/599 |
| 2012/0297765 | A1* | 11/2012 | Vigild | F01P 3/20 60/599 |
| 2013/0298554 | A1* | 11/2013 | Sellnau | F01P 3/20 60/609 |
| 2014/0172273 | A1* | 6/2014 | Levijoki | F02D 41/04 701/103 |
| 2015/0047374 | A1* | 2/2015 | Ulrey | B60S 1/023 62/79 |
| 2015/0159543 | A1* | 6/2015 | Chu | F01P 3/02 60/599 |

FOREIGN PATENT DOCUMENTS

| | | |
|---|---|---|
| KR | 20100116376 | 11/2010 |
| KR | 20120062364 | 6/2012 |
| KR | 20130021377 | 3/2013 |
| KR | 10-2015-0066354 | 6/2015 |

* cited by examiner

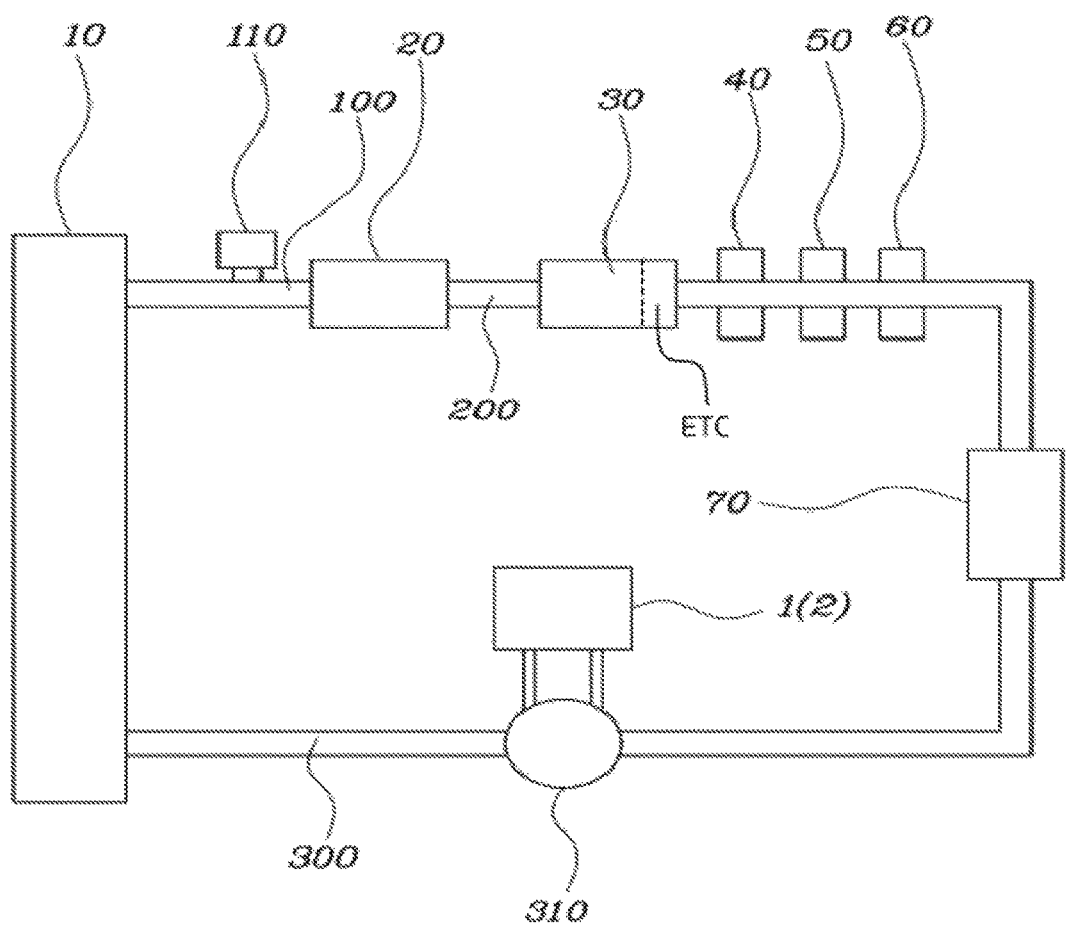

AUXILIARY COOLING SYSTEM

CROSS-REFERENCE TO RELATED APPLICATIONS

This application claims the benefit of Korean Patent Application No. 10-2015-0107952, filed on Jul. 30, 2015, the contents of which are incorporated herein by reference in its entirety.

FIELD

The present disclosure relates to an auxiliary cooling system of a vehicle provided with a turbo charger.

BACKGROUND

The statements in this section merely provide background information related to the present disclosure and may not constitute prior art.

Recently, efforts to improve fuel efficiency of vehicles are being conducted in various ways.

As one of various methods for improving the fuel efficiency, a method of using an EGR (exhaust gas recirculation) system which reuses exhaust gas to reduce fuel consumption and thus improve fuel efficiency is used.

A conventional EGR cooling device was proposed in a related art entitled "COOLING DEVICE FOR ENGINE EXHAUST GAS RECIRCULATION CIRCUIT," (please provide application or publication number for this reference).

The conventional technique includes a high-temperature loop which cools an engine, and a low-temperature loop which cools EGR gas, and embodies a high-efficiency cooling system using the high-temperature loop and the low-temperature loop that are separately provided.

SUMMARY

The present disclosure provides an auxiliary cooling system which can improve the fuel efficiency of vehicles in one form by having the separated cooling structures, a method, timing, etc. of circulating cooling water, particularly, through a low-temperature loop.

According to one form of the present disclosure, there is provided an auxiliary cooling system installed separately from an engine cooling passage in a vehicle having a turbo engine. The auxiliary cooling system includes a first line connecting a radiator and an intercooler to each other, with an electric water pump installed on the first line so that cooling water flows from the radiator toward the intercooler through the first line. A second line connects the intercooler and an intake manifold to each other and allowing the cooling water to flow therethrough. A third line connects the intake manifold and the radiator to each other and allowing the cooling water to flow therethrough; and a bypass valve selectively directs transferring cooling water, heated while passing through a turbine housing provided on a path of the third line, to the radiator or transferring the cooling water to the radiator via an engine block or a heater, wherein cooling water discharged from the intake manifold passes through an ETC (electronic throttle control) unit and thus reduces a temperature of intake air passing through the ETC unit.

The third line may supply cooling water discharged from the intake manifold to an EGR (exhaust gas recirculation) cooler and supply cooling water discharged from the EGR cooler to the turbine housing.

The third line may supply cooling water discharged from the intake manifold to a compressor housing and supply cooling water discharged from the compressor housing to the turbine housing.

The third line may supply cooling water discharged from the intake manifold to a bearing housing and supply cooling water discharged from the bearing housing to the turbine housing.

The third line may supply cooling water discharged from the intake manifold to an EGR cooler, supply cooling water discharged from the EGR cooler to a compressor housing, supply cooling water discharged from the compressor housing to a bearing housing, and supply cooling water discharged from the bearing housing to the turbine housing.

The water pump may start operation about 15 to 20 seconds after ignition of the vehicle is turned on and stop the operation about 20 to 30 seconds after the ignition of the vehicle is turned off. The bypass valve may selectively bypass cooling water heated while passing through the turbine housing to the engine block or the heater. Until the engine block is heated after the ignition of the vehicle is turned on, the cooling water may be bypassed to the engine block, or when the heater is operated, the heated cooling water may be bypassed to the heater, and when the engine block is in a heated state and the heater is not in operation, the heated cooling water may be directly transferred to the radiator without being bypassed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view showing the configuration of an auxiliary cooling system according to one form of the present disclosure.

The drawing described herein is for illustration purposes only and is not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, the present disclosure pertains to an auxiliary cooling system which is installed, separately from an engine cooling passage, in a vehicle provided with a turbo engine. The auxiliary cooling system includes a first line 100 which connects a radiator 10 and an intercooler 20 to each other and on which an electric water pump 110 is installed to enable cooling water to flow through the first line. A second line 200 connects the intercooler 20 and an intake manifold 30 to each other and allows cooling water to flow therethrough. A third line 300 is provided through which cooling water is discharged from the intake manifold 30 and passes through an electronic throttle control unit (ETC) to reduce the temperature of intake air, and a bypass valve 310 is provided which selectively directly transfers cooling water that has passed through the third line 300 and a turbine housing 70 to the radiator 10 or transfers the cooling water to the radiator 10 via an engine block 1 or a heater 2.

In one form, an EGR cooler 40, a compressor housing 50, and a bearing housing 60, etc. may be connected to the third line 300. Although these components are illustrated as being connected in series to each other in FIG. 1, the present disclosure is not limited to this configuration. For example, one or two components may be connected in series to each other. Alternatively, the three components may be connected in parallel to each other.

Furthermore, cooling water discharged from the intake manifold 30 is supplied to a hot water nipple of the ETC so as to reduce the temperature of intake air that flows through the ETC, thus enhancing the fuel efficiency. Cooling water that has been used to cool the ETC flows to the third line 300 and then is supplied to the EGR cooler 40, the compressor housing 50, and the bearing housing 60.

The third line 300 is divided into several sections. In the one form, the third line 300 may be divided into a first section in which cooling water discharged from the intake manifold 30 is supplied to the EGR cooler 40, the compressor housing 50 and the bearing housing 60. A second section is provided in which cooling water discharged from the bearing housing 60 is transferred to the turbine housing 70, and a third section is provided which connects the turbine housing 70 and the bypass valve 310 to each other, and a fourth section is provided which connects the bypass valve 310 and the radiator 10 to each other. Here, cooling water that flows through the first section passes through the ETC.

In the conventional technique, engine cooling water was used to cool the EGR cooler 40, the bearing housing 60, etc. However, there was a problem in that cooling efficiency is comparatively low because the temperature of engine cooling water is very high, that is, 95° C. or more.

Practically, in the case where the conventional method using engine cooling water is used to cool the components, the temperature of EGR gas that has passed through the EGR cooler 40 ranged from about 105° C. to about 110° C., and the temperature of an outlet of the bearing housing 60 was at a level ranging from 150° C. to 160° C. Thus, the reduction of the temperatures of the EGR cooler 40 and the bearing housing 60 was limited.

Given this, in the present disclosure, cooling water that has passed through the intercooler 20 and the intake manifold 30 is directly transferred to the EGR cooler 40, the compressor housing 50 and the bearing housing 60, whereby cooling effect by means of cooling water can be increased. Even though cooling water that has been cooled by the radiator 10 passes through the intercooler 20 and the intake manifold 30, the temperature thereof is only at a level ranging from 45° C. to 50° C. Therefore, satisfactory cooling performance can be maintained.

Cooling water (about 100° C.) that has passed through the EGR cooler 40, the compressor housing 50 and the bearing housing 60 along the third line 300 is supplied to the turbine housing 70 and used to cool exhaust gas. Cooling water discharged from the turbine housing 70 is re-cooled by the radiator 10 and then circulated to the intercooler 20.

Here, the temperature of cooling water that has passed through the turbine housing 70 is about 150° C., and the heat thereof may be reused. That is, the bypass valve 310 may be provided to control movement of the cooling water such that cooling water discharged from the turbine housing 70 is supplied to the engine block 1 or the heater 2 and thus transfers heat thereto before being moved to the radiator 10. Cooling water which flows through the third line 300 is bypassed to a bypass supply pipe by the bypass valve 310 and thus supplied to the engine block 1 or the heater 2. Cooling water that has heated the engine block 1 or the heater 2 is returned to the bypass valve 310 through a bypass discharge pipe and then supplied to the radiator 10.

In one form, the bypass valve 310 is configured such that, until the engine block 1 is heated after the ignition of the vehicle is turned on, heated cooling water is bypassed to the engine block, and when the heater 2 is operated, heated cooling water is bypassed to the heater 2.

Particularly, because the engine block 1 is in a cold state just after the ignition of the engine is turned on, the friction thereof is comparatively large. As such, in the case where the friction is large, it acts as resistance to the operation of the engine, thus reducing the fuel efficiency. Therefore, if the engine block 1 is rapidly heated in early stage, the friction is reduced, whereby the fuel efficiency can be improved.

However, after the engine block 1 is heated to a predetermined degree, because the engine itself generates heat, the cooling water acts to cool the engine block 1 after a predetermined time has passed after the ignition on rather than heating the engine block 1. In addition, since a lot of heat is transferred to cooling water while the cooling water passes through the engine block 1, the radiator 10 may not be able to sufficiently cool the cooling water. Therefore, in one form, the time for which cooling water is supplied to the engine block 1 is limited to a range from several seconds to several minutes in early stage after the ignition has been turned on.

In one form, the water pump 110 that is installed on the first line 100 as a power source for circulating the cooling water starts operation about 15 to 20 seconds after the ignition has been turned on. Furthermore, the water pump 110 preferably stops operation about 20 to 30 seconds after the ignition of the vehicle has been turned off.

If cooling water circulates from the beginning of the ignition, exhaust gas is excessively cooled while passing through the turbine housing 70, and exhaust gas catalysts which are activated by heat of exhaust gas cannot be reliably activated. Given this, if cooling water begins to circulate after the turbine housing 70 has been heated to a predetermined degree rather than just after the ignition is turned on, the exhaust gas catalysts can be rapidly activated.

Furthermore, just after the ignition is turned off, a turbine wheel is in a very high temperature state. If the circulation of cooling water stops immediately after the ignition is turned off, the turbine wheel may be damaged by heat. For this, the water pump 110 circulates the cooling water for about 20 to 30 seconds after the ignition is turned off, thus inhibiting the turbine wheel from being damaged by high-temperature heat.

In one form, an electric pump, rather than a mechanical pump interacting with the engine, is used as the water pump 110 so that it can circulate the cooling water even when the ignition is turned off and the engine is stopped. Because the mechanical pump stops operation immediately after the engine stops, the use of the mechanical pump may not be suitable for the present disclosure.

As having described, an auxiliary cooling system according to the present disclosure has the following effects.

First, knocking characteristics are mitigated by cooling EGR gas, whereby fuel efficiency can be enhanced.

Second, cooling water that is heated in an early stage after the ignition is turned on is supplied to an engine block to heat the engine block, thus reducing friction of the engine block. Consequently, fuel efficiency can be further improved.

Third, even after the ignition is turned off, a water pump is operated for a predetermined time to cool the turbine housing. Thereby, the lifetime of the turbine housing may be increased.

Fourth, after a predetermined time has passed after the ignition is on, the water pump starts operation. Therefore, exhaust gas heat can activate catalysts before the cooling operation begins.

Although the various forms of the present disclosure have been disclosed, those skilled in the art will appreciate that various modifications, additions and substitutions are possible, without departing from the scope and spirit of the disclosure as disclosed in the accompanying claims.

Therefore, it should be understood that the forms disclosed are only for illustrative purpose and do not limit the bounds of the present disclosure. It is intended that the bounds of the present disclosure are defined by the accompanying claims, and various modifications, additions and substitutions, which can be derived from the scope and equivalent concepts of the accompanying claims, fall within the bounds of the present disclosure.

What is claimed is:

1. An auxiliary cooling system installed separately from an engine cooling passage in a vehicle provided with a turbo engine, the auxiliary cooling system comprising:
    a first line connecting a radiator and an intercooler to each other, with an electric water pump installed on the first line so that cooling water flows from the radiator toward the intercooler through the first line;
    a second line connecting the intercooler and an intake manifold to each other and allowing the cooling water to flow therethrough;
    a third line connecting the intake manifold and the radiator to each other and allowing the cooling water to flow therethrough; and
    a bypass valve that selectively directs transferring cooling water, heated while passing through a turbine housing provided on a path of the third line, to the radiator or transferring the cooling water to the radiator via an engine block or a heater,
    wherein cooling water discharged from the intake manifold passes through an ETC (electronic throttle control) unit and thus reduces a temperature of intake air passing through the ETC unit, and
    wherein the third line supplies cooling water discharged from the intake manifold to an EGR (exhaust gas recirculation) cooler and supplies cooling water discharged from the EGR cooler to the turbine housing.

2. The auxiliary cooling system according to claim 1, wherein the third line supplies cooling water discharged from the intake manifold to a compressor housing and supplies cooling water discharged from the compressor housing to the turbine housing.

3. The auxiliary cooling system according to claim 1, wherein the third line supplies cooling water discharged from the intake manifold to a bearing housing and supplies cooling water discharged from the bearing housing to the turbine housing.

4. The auxiliary cooling system according to claim 1, wherein the third line supplies cooling water discharged from the intake manifold to an EGR cooler, supplies cooling water discharged from the EGR cooler to a compressor housing, supplies cooling water discharged from the compressor housing to a bearing housing, and supplies cooling water discharged from the bearing housing to the turbine housing.

5. The auxiliary cooling system according to claim 1, wherein the water pump starts operation 15 to 20 seconds after ignition of the vehicle is turned on and stops the operation 20 to 30 seconds after the ignition of the vehicle is turned off, and
    the bypass valve selectively bypasses cooling water heated while passing through the turbine housing to the engine block or the heater, wherein until the engine block is heated after the ignition of the vehicle is turned on, the cooling water is bypassed to the engine block, or when the heater is operated, the heated cooling water is bypassed to the heater, and when the engine block is in a heated state and the heater is not in operation, the heated cooling water is directly transferred to the radiator without being bypassed.

6. An auxiliary cooling system installed separately from an engine cooling passage in a vehicle provided with a turbo engine, the auxiliary cooling system comprising:
    a first line connecting a radiator and an intercooler to each other, with an electric water pump installed on the first line so that cooling water flows from the radiator toward the intercooler through the first line;
    a second line connecting the intercooler and an intake manifold to each other and allowing the cooling water to flow therethrough;
    a third line connecting the intake manifold and the radiator to each other and allowing the cooling water to flow therethrough; and
    a bypass valve that selectively directs transferring cooling water, heated while passing through a turbine housing provided on a path of the third line, to the radiator or transferring the cooling water to the radiator via an engine block or a heater,
    wherein cooling water discharged from the intake manifold passes through an ETC (electronic throttle control) unit and thus reduces a temperature of intake air passing through the ETC unit, and
    wherein the third line supplies cooling water discharged from the intake manifold to an EGR cooler, supplies cooling water discharged from the EGR cooler to a compressor housing, supplies cooling water discharged from the compressor housing to a bearing housing, and supplies cooling water discharged from the bearing housing to the turbine housing.

7. An auxiliary cooling system installed separately from an engine cooling passage in a vehicle provided with a turbo engine, the auxiliary cooling system comprising:
    a first line connecting a radiator and an intercooler to each other, with an electric water pump installed on the first line so that cooling water flows from the radiator toward the intercooler through the first line;
    a second line connecting the intercooler and an intake manifold to each other and allowing the cooling water to flow therethrough;
    a third line connecting the intake manifold and the radiator to each other and allowing the cooling water to flow therethrough; and
    a bypass valve that selectively directs transferring cooling water, heated while passing through a turbine housing provided on a path of the third line, to the radiator or transferring the cooling water to the radiator via an engine block or a heater,
    wherein cooling water discharged from the intake manifold passes through an ETC (electronic throttle control) unit and thus reduces a temperature of intake air passing through the ETC unit, wherein the water pump starts operation 15 to 20 seconds after ignition of the vehicle is turned on and stops the operation 20 to 30 seconds after the ignition of the vehicle is turned off, and the bypass valve selectively bypasses cooling water heated while passing through the turbine housing to the engine block or the heater, wherein until the engine block is heated after the ignition of the vehicle is turned on, the cooling water is bypassed to the engine block, or when the heater is operated, the heated cooling water is bypassed to the heater, and when the engine block is in a heated state and the heater is not in operation, the heated cooling water is directly transferred to the radiator without being bypassed.

\* \* \* \* \*